(12) United States Patent
Vest

(10) Patent No.: US 7,552,060 B2
(45) Date of Patent: Jun. 23, 2009

(54) METHOD FOR DETERMINING COMPATIBILITY

(75) Inventor: Herb D. Vest, Dallas, TX (US)

(73) Assignee: HDVE, LLC, Irving, TX (US)

( * ) Notice: Subject to any disclaimer, the term of this patent is extended or adjusted under 35 U.S.C. 154(b) by 240 days.

(21) Appl. No.: 11/201,929

(22) Filed: Aug. 11, 2005

(65) Prior Publication Data

US 2006/0015487 A1    Jan. 19, 2006

Related U.S. Application Data

(63) Continuation of application No. 10/736,120, filed on Dec. 15, 2003, now abandoned.

(51) Int. Cl.
*G06Q 99/00* (2006.01)
(52) U.S. Cl. .......................................................... 705/1
(58) Field of Classification Search ...................... 705/1
See application file for complete search history.

(56) References Cited

U.S. PATENT DOCUMENTS 6,052,122 A * 4/2000 Sutcliffe et al. ............. 715/751
6,735,568 B1 * 5/2004 Buckwalter et al. ............. 705/1
2001/0034708 A1 * 10/2001 Walker et al. ................. 705/51
2002/0040310 A1 * 4/2002 Lieben et al. .................. 705/7
2002/0045154 A1 * 4/2002 Wood et al. ................. 434/350
2002/0116458 A1 * 8/2002 Bricklin et al. ............. 709/204

* cited by examiner

*Primary Examiner*—Jonathan Ouellette
(74) *Attorney, Agent, or Firm*—David W. Carstens; Carstens & Cahoon, LLP

(57) ABSTRACT

A method, program and system are provided for selecting and matching personal profiles based on personal characteristics and psychological traits. The method includes creating a profile of a user based on the user's personal characteristics and answers to psychological test items, wherein the profile further includes user preferences concerning potential partners. A plurality of characteristics filters are applied to a database of target profiles, wherein each target profile passes through a given characteristic filter only if the characteristic in question in both the target profile and the user profile complies with the filter's rule. The operation of the filter may be influenced by preferences in the user profile and the target profiles. A compatibility index is calculated for the user relative to each target profile that passes through all of the trait filters. The invention then creates a match list that ranks target profiles relative to the user according to their respective compatibility index.

27 Claims, 7 Drawing Sheets

METHOD FOR DETERMINING COMPATIBILITY

CROSS REFERENCE TO RELATED APPLICATION

This application is a continuation of application Ser. No. 10/736,120, filed on Dec. 15, 2003 now abandoned.

BACKGROUND OF THE INVENTION

1. Technical Field

The present invention relates generally to automated matching between sets of predetermined traits, and more specifically to matching people as potential life partners based on a calculated index of compatibility.

2. Description of Related Art

With the increasing role of computers and the Internet in daily life, more and more people are establishing and maintaining friendships through electronic means of communication and interaction, that until recently were relatively impersonal. Even recently, the Internet has allowed for the proliferation of a multitude of dating services, which provide an inexpensive and usually confidential means for learning about or meeting people. Computer dating services provide an organized way of classifying users and quickly screening candidates for potential partner matches. The Internet has provided easier access to such computer services, and has made it easier to collect information from much larger pools of users.

Currently, online dating services may be grouped into three major categories. The first category of online services is online dating sites that offer large databases of users but provide limited services and features. The goal at these sites is to offer numerous dating partners for members and subscribers. The vast majority of such sites are "mom and pop" businesses with limited member bases.

The second category of online services includes self-discovery sites that offer a wide range of entertainment, pop culture, and self-discovery tests and information. These sites operate under a business model of collecting information on their users, thereby providing a fertile database for advertisers.

The third category of online services uses psychological testing to recommend appropriate matches for their members. However, the testing tends to be cumbersome, and such services offer very limited user control over the process.

As such, the currently available services offer users very little guidance in finding potential matches based on personal traits, or they take the process out of the user's hands and present matches without the input of user preferences. It would therefore be desirable to have a method for matching potential life partners based on the bi-directional matching of socio-demographic and psychological traits according to the results of relevant empirical research as well as specified user preferences.

SUMMARY OF THE INVENTION

The present invention provides a method, program and system for selecting and matching personal profiles based on personal background data and psychological traits. The method includes the computer-implemented steps of creating a profile of the user based on the user's personal characteristics and answers to personality test items, wherein the profile further includes user preferences concerning potential partners. A plurality of characteristics filters are applied to a database of target profiles, wherein each target profile passes through a given characteristic filter only if the characteristic in question in both the target profile and the user profile complies with the filter's rule. The operation of the filter may be influenced by preferences in the user profile and the target profiles.

A compatibility index is then calculated for the user relative to each target profile that passes through all of the trait filters. The compatibility index is computed by: 1) scoring personal characteristics and weighing the scores according to empirically derived models and user preferences to produce a combined personal characteristic score, 2) scoring the psychological data according to matching algorithms derived from empirical research on relationships, and 3) weighing the psychological data score relative the personal characteristic score according to the user's gender and preference regarding short-term versus long-term relationships. The invention then creates a match list that ranks target profiles relative to the user according to their respective compatibility index.

BRIEF DESCRIPTION OF THE DRAWINGS

The novel features believed to be unique to the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
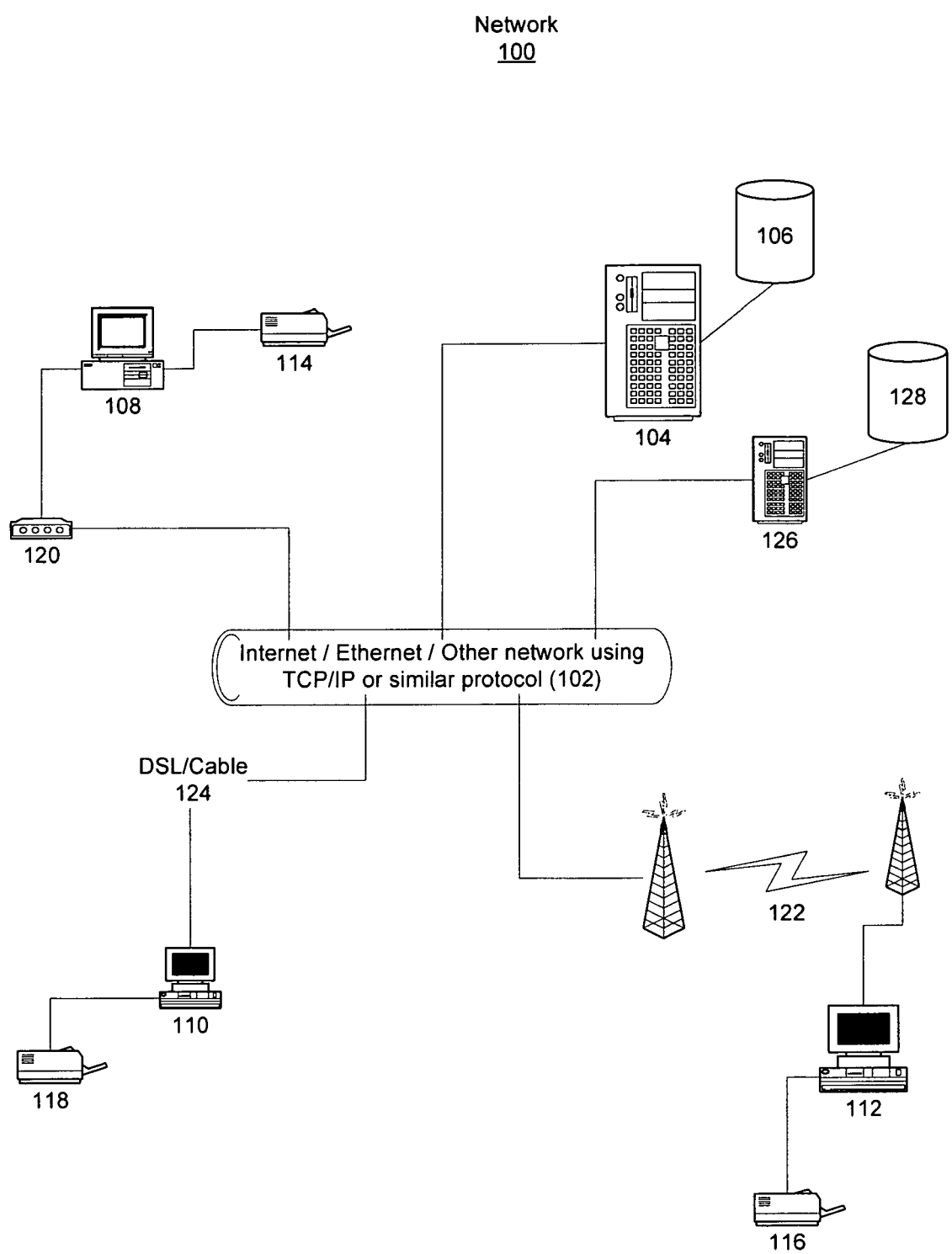
FIG. 1 depicts a pictorial representation of a network of data processing systems by means of which the present invention may be implemented.

With reference now to the figures, FIG. 1 is a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Network data processing system 100 might also contain a supplementary server 126 and additional data storage 128.

Clients 108, 110, and 112 are clients to server 104. Network data processing system 100 includes printers 114, 116, and 118, and may also include additional servers, clients, and other devices not shown. The means by which clients 108-112 connect to the network 102 may include conventional telephone landline 120, broadband Digital Service Line (DSL) or cable 124, or wireless communication network 122.

In the depicted example, network data processing system 100 is the Internet with network 102 representing a worldwide collection of networks and gateways that use the TCP/IP suite or similar protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
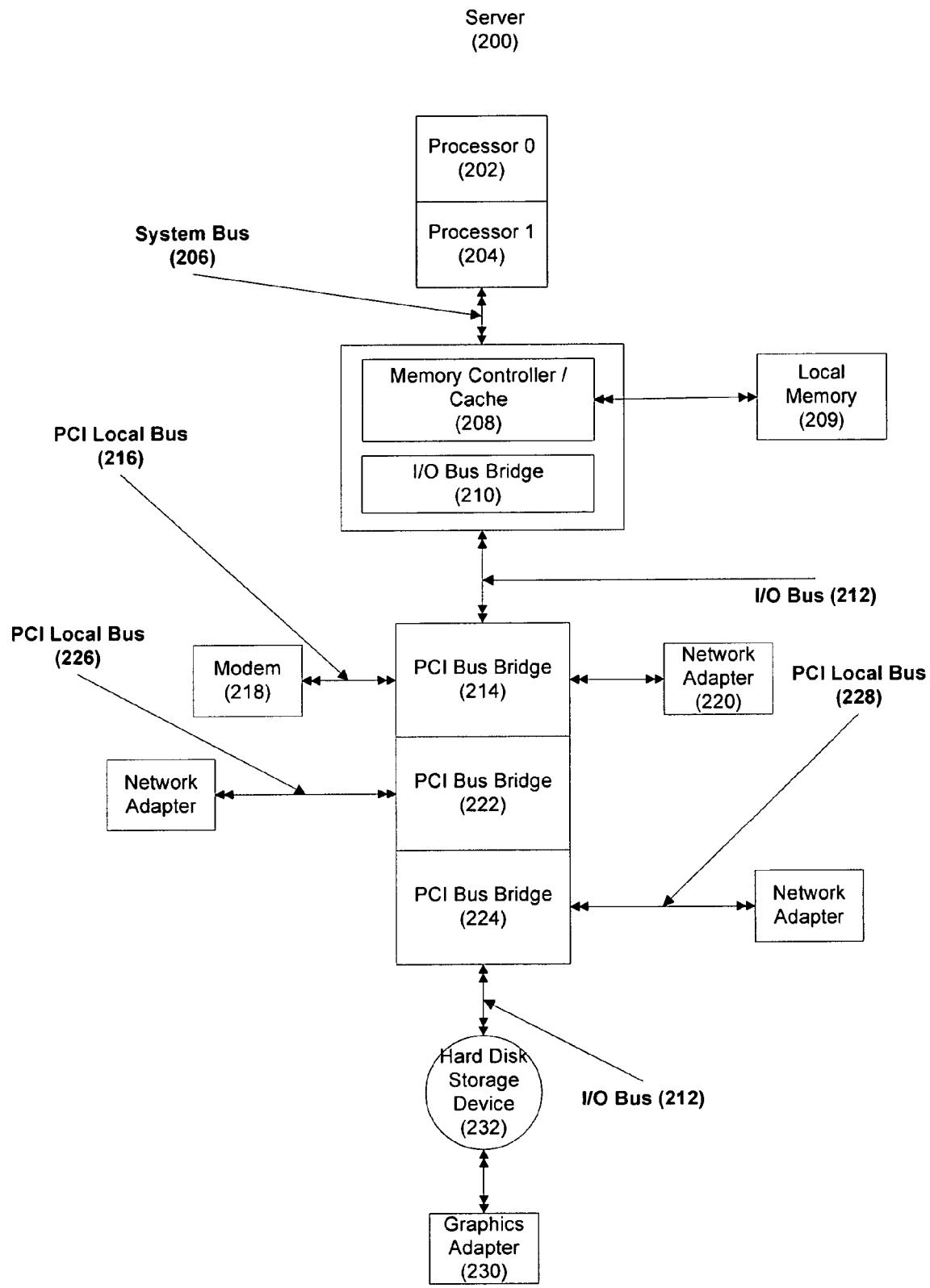
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. 1/0 bus bridge 210 is connected to system bus 206 and provides an interface to 1/0 bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communication links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
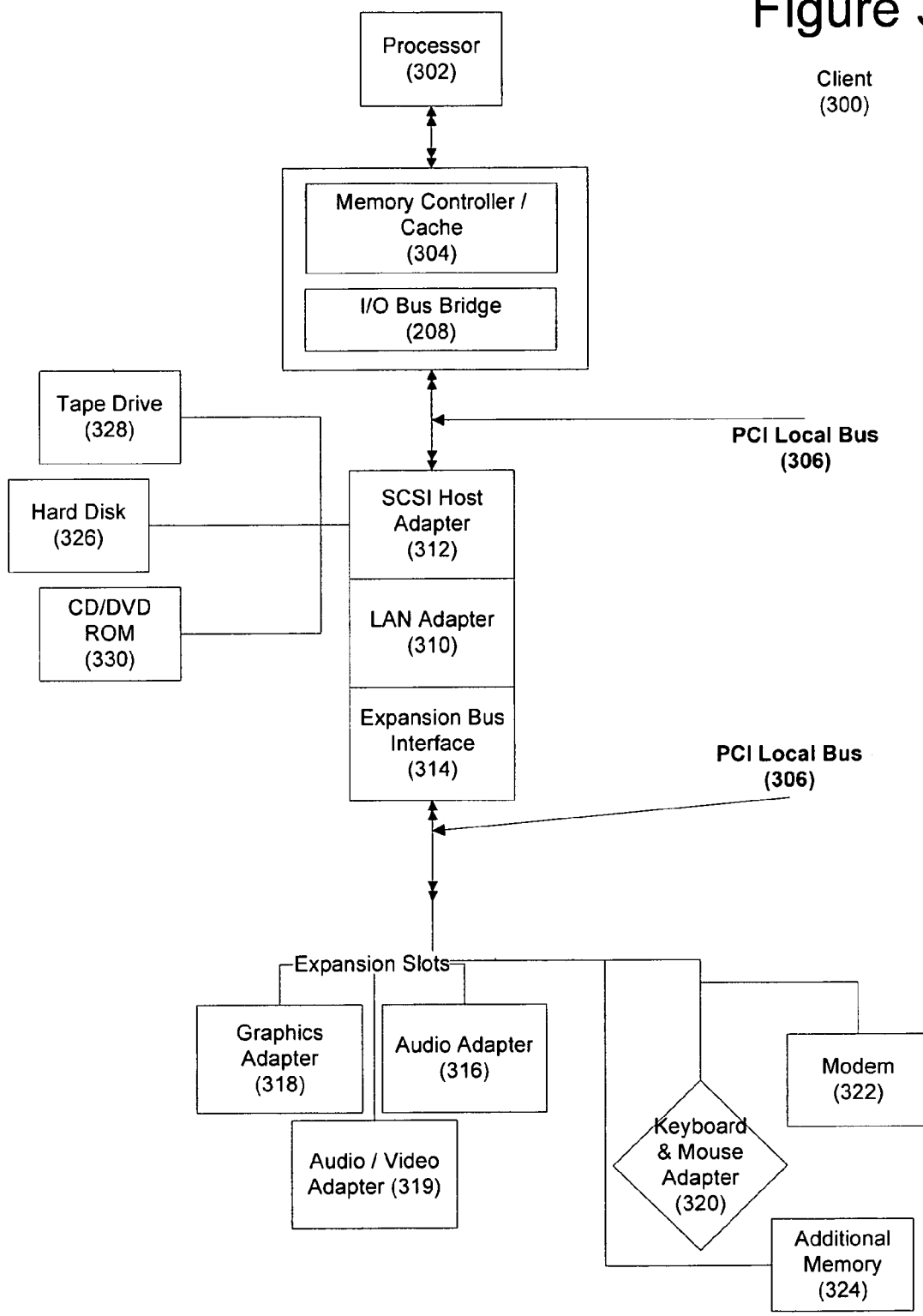
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD/DVD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and the above-described examples are not meant to imply architectural limitations. For example, data processing system 300 also may be a notebook computer or hand-held computer in addition to taking the form of a PDA. Data processing system 300 also may be a kiosk or a Web appliance.

Figure 4:
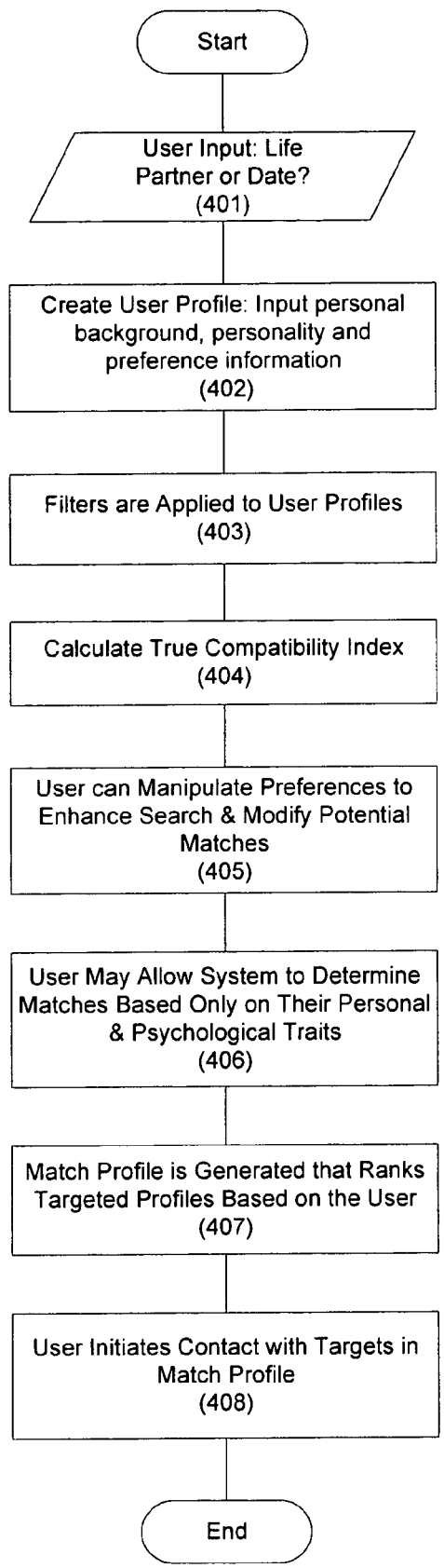
FIG. 4 is a flowchart illustrating an overview of the process by which a compatibility index is computed and matched against possible candidates in accordance with the present invention.

FIG. 4 is a flowchart illustrating an overview of the process by which a compatibility index is computed and matched against possible candidates in accordance with the present invention. When the user enters the web site and begins the process, the first step is to specify whether he or she is seeking a potential life partner or merely wants to meet people to date (step 401). This decision affects the weights given to psychological and socio-demographic background characteristics in determining potential matches (explained in detail below). The user then creates a profile that includes personal background information, personality information, and preferences regarding potential partners (step 402).

Figure 5:
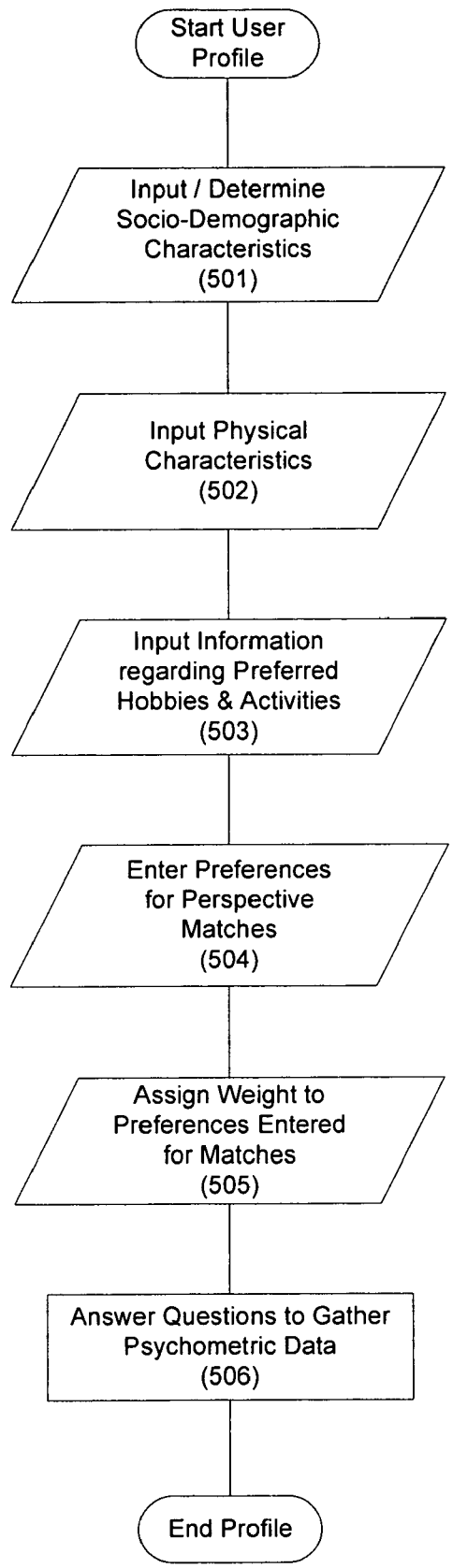
FIG. 5 is a flowchart illustrating in more detail the process by which a user profile is created in accordance with the present invention.

FIG. 5 is a flowchart illustrating in more detail the process by which a user profile is created in accordance with the present invention. The user profile comprises four major domains: socio-demographic background, physical attributes, interests/activities, and psychological attributes (personality traits). The user begins by supplying socio-demographic information about himself or herself (step 501). Examples of socio-demographic characteristics include gender, age, language(s) spoken, ethnicity, political leanings, zip code, occupation, religion, education, and drinking and smoking habits.

After supplying the relevant socio-demographic information, the user provides information about his or her physical characteristics, e.g., height, hair and eye color, body type, perceived attractiveness, any tattoos, etc. (step 502).

The user then enters information about interests and preferred activities and hobbies, e.g., music, sports, movies, etc. (step 503). The user may choose from among a list of interests and activities or enter his or her interests.

In addition to providing information about him or her self, the user also has the opportunity to enter preferences for the characteristics of potential partners in each of the first three domains described above (step 504). In steps 501 through 503, the user describes who he or she is. Step 504 allows the user to describe the kind of potential partner he or she is looking to meet. The user can also assign a weight to each of his or her preferences (step 505). Specifically, the user can describe the trait in question as being not important, somewhat important, or very important.

Finally, the user answers a series of questions designed to provide psychological data about the user (step 506). Unlike the other domains, the user does not specify partner preferences or weights for the psychological data. Instead, the user's answers are evaluated according to a empirically derived models. The psychological questionnaire assesses personality traits, attitudes toward people and ideas, and how the user would react in particular situations.

The psychological evaluation is broken down into several categories, including traits such as communication style, conflict resolution, sexuality, social life, values hierarchy, personal characteristics, money attitudes, gender roles, attachment style parenting style, and stress reaction. Each one of these categories is further broken down into subcategories. For example, communication style might by further broken down to include comfort with vulnerability, need for intimacy, open-mindedness, and ability to communication (i.e. skills). As another example, the category of personal characteristics may be further divided into readiness to commit, self-image, conscientiousness, integrity, adventurousness, rigidity, and dominance (i.e. need for control).

The user answers several questions related to each category and subcategory. In this process, the invention employs dynamic testing in order to clearly define the user. Each question allows the user to answer on a graduated scale according to how much the user agrees or disagrees with a statement or how strongly the user identifies with a particular situation. Several questions are used for each trait.

If a user possesses a particular trait, e.g., if that person is comfortable expressing emotions, his or her answers will tend to display a consistent pattern. However, if there is significant variability among a group of answers related to the same trait, it might not be possible to clearly define the user. In that case, the system asks additional question in order to establish a more consistent pattern. Questions may also be dynamically scored, wherein an answers is compared to other answers within the same category or subcategory. If a particular answer deviated significantly from the other questions (similar to a best fit curve), the answer score is adjusted accordingly to bring into closer alignment with the other answers. Obviously, the ability to adjustment a particular score depends on the number of other answers and variability among those answers. As a result of this dynamic testing, each user takes a unique, individualized test according to that person's psychological trait and responses.

Returning to FIG. 4, in standard mode, the system applies filters to both the user the profile and profiles of potential partners that are already stored in a database (step 403). Filters save time and resources by quickly eliminating candidates in the database who are poor matches for the user based on key characteristics. Realistically, the filters may eliminate as many as 98% of the personal profiles stored in the database. The particular background characteristics to which system level filters are applied are usually few in number and are chosen based on empirical research into which traits are most crucial to the success or failure of relationships. Examples of personal characteristics that might have system level filters include gender, age, religion, ethnicity, language, attractiveness, and location.

In addition to the system level filters, the user may add custom filters by specifying types of people he or she does not want to meet. For example, the user may specify that she is not interested in smokers or does not want to go out with lawyers or musicians. In that case, the invention will filter out anyone with those traits. Similarly, the user can negate the system level filters by specifying that a filtered trait (e.g., ethincity) is not important, in which case the filter is ignored.

The filters are applied bilaterally. Therefore, in addition to filtering target candidates based on their personal traits and the user's stated preferences, the user himself is also filtered from the pool of targets based on his traits and the targets' stated preferences. For example, a target might be close to the user's preferred age range, in which case the target would pass through the user's filters. However, the user might be too old or young for the target's preferred age range, in which case the user would be filtered. Only if both the user and target pass through each other's filters do they remain potential candidates for each other.

Figure 6:
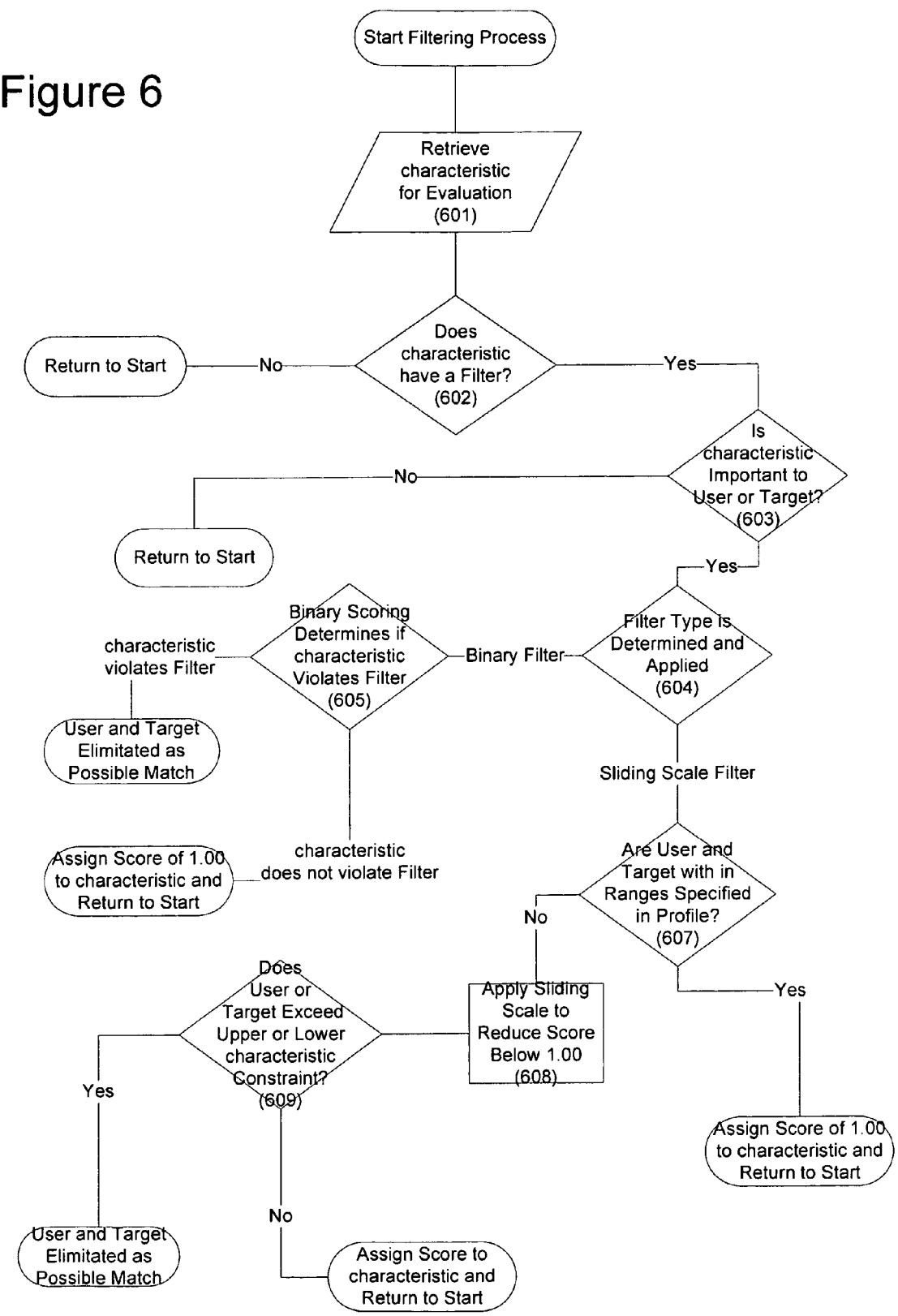
FIG. 6 is a flowchart illustrating in detail the process of applying filters to personal profiles in accordance with the present invention.

FIG. 6 is a flowchart illustrating in detail the process of applying such filters to personal profiles in accordance with the present invention. When applying the filters, the system retrieves the next characteristic to be evaluated (step 601) and determines whether the characteristic does indeed have a filter associated with it (step 602). As mentioned above, only a select number of personal characteristics are filtered. Most variables (e.g., hair and eye color, occupation, personal interests) do not have filters (unless the user has specifically added one) because differences with regard to such variables have shown not to be critical for the success or failure of a relationship. Therefore, if the characteristic in question does not have an associated filter, the system simply returns to start and retrieves the next characteristic.

If the characteristic in question does have a filter, the system determines if that characteristic is important to either the user or the target or both (step 603). The user and target's weighing of preferences affect how the filters are applied. If the characteristic has an associated filter, but both the user and the target have stated that the characteristic is not important to them, the filter is ignored and the process returns to start to retrieve the next characteristic. However, if either the user or the target states that the characteristic in question is somewhat or very important, the filter is applied and the system then determines if the filter is a simple binary filter or uses a sliding scale in conjunction with a binary filter (step 604).

If the filter does not have a sliding scale, the system uses simple binary (true/false) scoring and determines if the characteristic violates the filter (step 605). If either the user or target violates the filter rule, they are eliminated as a possible match for each other (step 605). For example, if the user is a woman looking to meet a man, the system will automatically exclude all women in the database. If the characteristic does not violate the filter, it is assigned a normal score of 1.00, and the system returns to start to retrieve the next characteristic.

If the filter has a sliding scale, it uses a combination of linear scoring and binary scoring. The linear scoring adjusts the score depending on how far the variable in question deviates from a specified value. In addition, the binary value of the variable is TRUE as long as the value is within a defined range. However, if the value deviates too far from the specified value, the filter switches entirely to binary scoring and changes the value to FALSE, excluding the candidate entirely. The upper and lower limits for binary scoring are based on empirical research, and the sliding scale is based on both empirical data and user weights. Sliding scales are applied to characteristics that naturally allow some degree of variance latitude for a successful matching of user and target, e.g., some degree of permissible difference in age, height, and distance between respective residences.

In the case of a sliding scale, the matching characteristic has a range of values specified by both the user and the target in their respective preferences, and the system determines if the user and target fall within those ranges (step 607). If the user and/or target fall within the range, the matching characteristic is assigned a normalized value of 1.00 for that person, and the system retrieves the next variable.

If the user or target falls outside the other's range, the invention applies a sliding scale to reduce the values of the score below 1.00 (step 608). However, there is a limit to how much a score will be reduced.

Each characteristic with a sliding scale also has upper and lower constraints that act as absolute filters. The invention determines if the target (or user) exceeds those constraints (step 609), and if either the user or the target is too far outside the other's preference range, that person is eliminated as a potential match for the other person. If the target and the user do not exceed the respective constraints, respective adjusted scores are assigned to the characteristic for both the user and the target, and the process return to start.

The following example will help to illustrate the interrelationship between the sliding scale and the constraints. Users may specify an age range of people they are interested in meeting. For example, a woman might specify that she is interested in men between the ages of 30 and 40. All men in the database pool that fall within that age range are assigned a normalized value of 1.00. The empirical scoring model uses a slope of 0.15 points per year over the specified age range and a slope of 0.25 points per year under the age range. Therefore, a 42-year-old man would be assigned a normalized value of 0.85 [(0.70)(0.5)+(0.5)]. A 28-year-old man would have a normalized value of 0.75.

In addition to the sliding scale, there is an upper cut-off limit of 12.5 years over the specified age range, and a lower cut-off limit of 7.5 years. Therefore, any man in the database over the age of 52 would automatically be excluded as a possible match, as would any man under the age of 23.

As another example, if the user is a man who specifies that he is interested in meeting women between the ages of 30 and 40, the empirical model uses a different sliding scale, as well as different upper and lower limits. As with the example of male candidates in the above example, all female candidates in the database that fall within the 30 to 40 age range receive a normalized score of 1.00. For women over the age of 40, the model uses a slope of 0.30 points per year, while a slope of 0.15 points per year is used for women under the age of 30. Therefore, a 42-year-old woman would have a normalized score of 0.70, while a 28-year-old woman would have a normalized score of 0.85.

The upper cut-off limit for women over the specified range is 7.5 years, and the lower cut-off limit for women under the specified range is 10.0 years. Therefore, any woman in the database over the age of 47 would be excluded, as would any woman under the age of 20.

The specific slopes and limits used in the examples above are merely example values. The actual values will depend on the specific empirical data used to create the scoring model and might change as additional empirical data are gathered and the model is refined. However, the above examples illustrate the important point that the values may vary between genders depending upon the characteristic being scored.

Returning to FIG. 4, after the filters have been applied to the user and the targets in the database, the invention calculates a True Compatibility Index (TCI) score for both the user and each remaining target that passed through the selection filters (step 404). The User TCI measures how well the target matches the user, while the Target TCI measures how well the user matches the target. In addition to the individual User and Target TCIs, there is also a paired TCI that measures the overall match between the user and target. It is the paired TCI score that is presented to the user as the final compatibility score.

Figure 7:
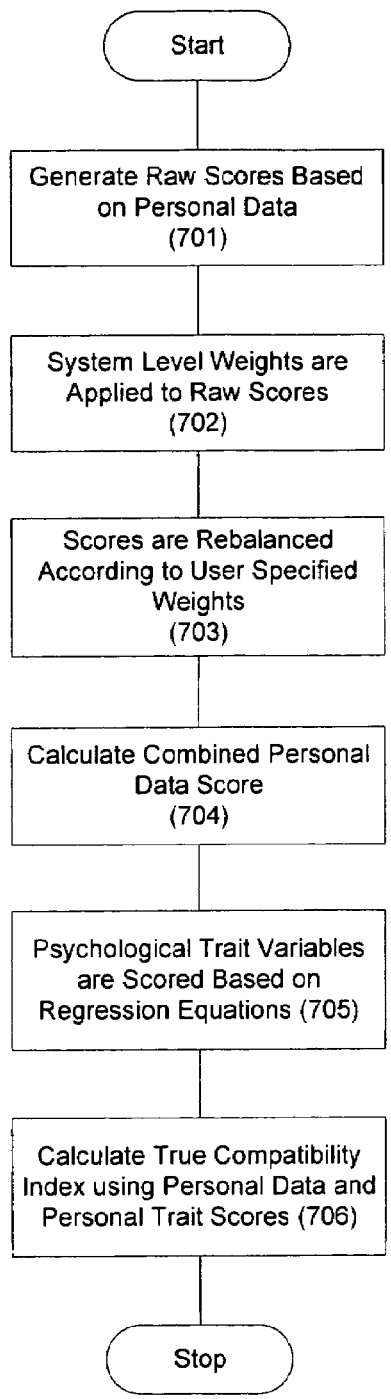
FIG. 7 is a flowchart illustrating the process of compatibility index scoring in accordance with the present invention.

Referring now to FIG. 7, a flowchart illustrating the process of compatibility index scoring is depicted in accordance with the present invention. In calculating the TCI score, the personal profile domains are separated into two major categories. The socio-demographic, interests/activities, and physical characteristics are all grouped under Personal Data (PD). The personality information is classified and scored separately as Psychological Traits (PT).

For the Personal Data the invention begins by generating raw scores for the variables (step 701). The variables are scored according to algorithms that compare personal information to user preferences. Each trait may have its own algorithm. For example, eye color is scored in a binary manner, since the target either does or does not meet the user's preference. However, unlike filtered traits (e.g., gender), eye color is not a basis for excluding the target as a possible match (unless the user specifically added a filter for this trait, as explained above). Therefore, rather than filtering the target, points are added or subtracted from the target's compatibility score depending on whether it conforms to the user preference and how important the trait is to the user.

Other traits (e.g., height or income) are scored according to a sliding scale similar to that described in relation to FIG. 6 but without the upper and lower constraints. The scores are adjusted down the further the target is from the user's preferred range, but no excluding filters are applied (unless the user has added filter constraints for these traits).

The invention then applies system-level weights to the raw scores (step 702). These weights are based on statistical analyses of survey data establishing the relative importance of each trait to a cross section of potential users. After the system-level weights are applied, the scores are rebalanced according to user specified weights to produce a score for each PD domain (step 703). For example, if the user specifies a trait as not being important, it is ignored. If the user specifies that trait as being somewhat important, it receives a weight of 1. If the trait is specified as very important, it receives a weight of 2. After the invention calculates scores for the individual PD domains (socio-demographic, physical traits, and interests), it calculates a combined PD score (step 704).

The invention then scores the PT variable (step 705). Based on the psychological test described above, the invention is able to define the user (and targets in the database) according to each category and subcategory factor. Each psychological trait is compared between the user and each target, and a score is assigned to that trait according to compatibility and importance. As with the PD variables, compatibility scores are determined for each subcategory, then each category, and finally a combined PT score. However, unlike the PD score, the PT score does not involve user-defined weights or preferences. Instead, PT scoring is performed according to matching algorithms derived from empirical research on relationships.

Once the PD and PT scores have been calculated, the invention calculates the True Compatibility Index (TCI) score using domain level weights for the PD and PT scores (step 706). The domain weights refer back to step 401, in which the user chooses whether he or she is seeking a dating relationship or a life partner. The relative importance of psychological traits versus socio-demographic and physical characteristics varies not only with the seriousness and intended length of the desired relationship but also with gender. The following chart is an example that illustrates the weight assigned to the PT score relative to the PD score, depending on the type of relationship and the gender of the user:

|  | Life | Dating |
|---|---|---|
| Male | 1.5 | 1 |
| Female | 2.25 | 1.5 |

For example, if a man specifies in step 401 that he is seeking a life partner, then the PT score is weighed one and a half times the averaged PD score. However, if the user is a woman seeking a life partner, the PT score is weighed two and a quarter times the PD score. This reflects the empirical observation that for serious longer-term relationships, psychological traits are more important than socio-demographic characteristics, physical characteristics, and interests and hobbies. Furthermore, the importance of psychological traits is greater for women than for men. The specific numbers used in the chart are merely examples based on empirical research and are therefore subject to change as new research is performed.

Finally, the TCI score is normalized. It should be emphasized that steps 701-707 are performed for the user, the target, and the combined pair. The paired TCI score may also be adjusted to account for TCI variances between the user and the target. For example, if the individual user and target TCIs are both 0.80, the paired score will be higher than if the user and target TCIs were 0.90 and 0.70 respectively.

Returning to FIG. 4, after the paired TCI is calculated, the invention generates a match profile that ranks the targets according to how well they match the user (step 407). All target candidates in the database that are not excluded during filtering in step 403 are included in the ranked profile according to their respective paired TCI scores. In addition to the TCI score, the user is also provided with a detailed breakdown for each person listed in the ranked profile. This breakdown specifies how the user is or is not compatible with the target in regard to particular psychological, demographic and physical traits. Because it is highly improbable that two people are perfectly compatible with each other, the invention provides users with a detailed picture of how good a "fit" they are for each other and why. It is then up to the user to decide whether or not to initiate contact with targets in the match profile (step 408).

In addition to the standard mode of generating potential matches for the user, the invention provides alternate methods for finding potential matches. In the advanced custom search, the user is given the opportunity to manipulate his or preferences to find different matches (step 405). With the advanced custom search, the user can change preferences, preference weights (i.e., not important, very important) and can even ignore psychological characteristics. The resulting match profiles can then be added to the match profile generated in step 407. The user can employ the advanced custom search option to create multiple match profile lists that can be stored under the user's account along with the match profile generated in the standard operating mode.

At the other end of the spectrum, the invention also provides the option of generating a match profile based solely on the user's personal and psychological traits, without regard to user preferences or weights (step 406). This auto search function simply matches targets to the user based on the traits the user has, while ignoring which specific traits the user is seeking in others. As with the custom search, the auto match profile can be stored along with the other match profiles in step 407.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, to illustrate the practical application, and to enable others of ordinary skill in the art to understand the invention for various embodiments with various modifications as are suited to the particular use contemplated.

I claim:

1. A method for selecting and matching personal profiles based on personal characteristics and psychological traits, the method comprising the computer implemented steps of:
   (a) creating a profile of a user based on the user's personal characteristics and answers to psychological test items, wherein the profile further includes user preferences concerning potential partners;
   (b) applying a plurality of characteristic filters to a plurality of target profiles in a database, wherein each target profile passes through a given characteristic filter only if the characteristic in question in both the target profile and the user profile complies with the filter's rule, and wherein the filter may be influenced by preferences in both the user profile and the plurality of target profiles;
   (c) wherein at least a subset of said characteristic filters use binary scoring, wherein:
       if a characteristic in a target profile has a true value, the filter assigns a normal score to the characteristic; and
       if the characteristic has a false value, the filter excludes the target profile;
   (d) calculating a compatibility index for the user relative to each target profile that passes through all of the characteristic filters, wherein the compatibility index is calculated by the following steps:

scoring individual personal characteristics and weighing the scores according to empirically derived models and user preferences to produce a combined personal characteristic score;

scoring the psychological data according to matching algorithms derived from empirical research on relationships; and weighing the psychological data score relative to the combined personal characteristic score according to the user's gender and preference regarding short-term versus long-term relationships; and (e) creating and displaying a match list that ranks target profiles relative to the user according to their respective compatibility index.

2. The method according to claim 1, wherein the personal characteristics include:
socio-demographic information;
physical characteristics; and
interests and activities.

3. The method according to claim 1, wherein some of the plurality of characteristic filters use both sliding scale scoring and binary scoring, wherein the filter defines a preferred value range, and a constraint value that is outside the value range, wherein:
if the value of a characteristic in a target profile falls within the preferred range the filter assigns a normalized score to the characteristic;
if the value of the characteristic falls outside the preferred range but does not exceed the constraint value, the filter assigns a reduced normalized score to the characteristic according to a sliding scale; and
if the value of the characteristic exceeds the constraint value, the filter excludes the target profile.

4. The method according to claim 1, wherein characteristic filters are assigned to particular personal characteristics according to the findings of empirical research concerning which characteristics are rated as being important to relationship success.

5. The method according to claim 4, wherein the personal characteristics that have associated filters include at least one of the following:
gender;
age;
ethnicity;
religion;
language;
location; and
attractiveness.

6. The method according to claim 1, wherein a user may manually add filters to specific characteristics that do not already have associated filters.

7. The method according to claim 1, wherein a characteristic filter is ignored if preferences in both the user profile and target profile specify that the characteristic in question is not important.

8. The method according to claim 1, wherein the psychological test items may relate to the following traits:
communication style;
conflict resolution;
sexuality;
social life;
values hierarchy;
money attitudes;
gender roles;
attachment to others;
parenting approach;
stress reaction;
self image;
dominance in relationships;
conscientiousness;
adventurousness;
rigidity; and
integrity.

9. The method according to claim 1, wherein the compatibility index further comprises:
a user score that measures how well the target matches the user's preferences;
a target score that measures how well the user matches the target's preferences; and
a paired score that is a weighted average of the user and target scores.

10. The method according to claim 9, wherein the paired score decreases as variance between the user score and target score increases.

11. The method according to claim 1, wherein the psychological data score is weighed more heavily if the user is seeking a potential life partner than if the user is seeking a dating partner.

12. The method according to claim 1, wherein the psychological data score is weighed more heavily for women than for men.

13. The method according to claim 1, wherein the match list further comprises detailed information about the compatibility between the user and each target with respect to individual characteristics.

14. A computer program product in a computer readable medium for selecting and matching personal profiles based on personal characteristics and psychological traits, the computer program product comprising:

(a) first instructions for creating a profile of a user based on the user's personal characteristics and answers to psychological test items, wherein the profile further includes user preferences concerning potential partners;

(b) second instructions for applying a plurality of characteristic filters to a plurality of target profiles in a database, wherein each target profile passes through a given characteristic filter only if the characteristic in question in both the target profile and the user profile complies with the filter's rule, and wherein the filter may be influenced by preferences in both the user profile and the plurality of target profiles;

(c) wherein at least a subset of said characteristic filters use binary scoring, wherein:
if a characteristic in a target profile has a true value, the filter assigns a normal score to the characteristic; and
if the characteristic has a false value, the filter excludes the target profile;

(d) third instructions for calculating a compatibility index for the user relative to each target profile that passes through all of the characteristic filters, wherein the compatibility index is calculated by the following steps:
scoring individual personal characteristics and weighing the scores according to empirically derived models and user preferences to produce a combined personal characteristic score;
scoring the psychological data according to matching algorithms derived from empirical research on relationships; and
weighing the psychological data score relative to the combined personal characteristic score according to the user's gender and preference regarding short-term versus long-term relationships; and (e) fourth instructions for creating and displaying a match list that ranks target profiles relative to the user according to their respective compatibility index.

15. The computer program product according to claim 14, wherein the personal characteristics include:
   socio-demographic information;
   physical characteristics; and
   interests and activities.

16. The computer program product according to claim 14, wherein some of the plurality of characteristic filters use both sliding scale scoring and binary scoring, wherein the filter defines a preferred value range and a constraint value that is outside the value range, wherein:
   if the value of a characteristic in a target profile falls within the preferred range the filter assigns a normalized score to the characteristic;
   if the value of the characteristic falls outside the preferred range but does not exceed the constraint value, the filter assigns a reduced normalized score to the characteristic according to a sliding scale; and
   if the value of the characteristic exceeds the constraint value, the filter excludes the target profile.

17. The computer program product according to claim 14, wherein characteristic filters are assigned to particular personal characteristics according to the findings of empirical research concerning which characteristics are rated as being important to relationship success.

18. The computer program product according to claim 17, wherein the personal characteristics that have associated filters include at least one of the following:
   gender;
   age;
   ethnicity;
   religion;
   language;
   location; and
   attractiveness.

19. The computer program product according to claim 14, wherein a user may manually add filters to specific characteristics that do not already have associated filters.

20. The computer program product according to claim 14, wherein a characteristic filter is ignored if preferences in both the user profile and target profile specify that the characteristic in question is not important.

21. The computer program product according to claim 14, wherein the psychological test items may relate to the following traits:
   communication style;
   conflict resolution;
   sexuality;
   social life;
   values hierarchy;
   money attitudes;
   gender roles;
   attachment to others;
   parenting approach;
   stress reaction;
   self image;
   dominance in relationships;
   conscientiousness;
   adventurousness;
   rigidity; and
   integrity.

22. The computer program product according to claim 14, wherein the compatibility index further comprises:
   a user score that measures how well the target matches the user's preferences;
   a target score that measures how well the user matches the target's preferences; and
   a paired score that is a weighted average of the user and target scores.

23. The computer program product according to claim 22, wherein the paired score decreases as variance between the user score and target score increases.

24. The computer program product according to claim 14, wherein the psychological datascore is weighed more heavily if the user is seeking a potential life partner than if the user is seeking a dating partner.

25. The computer program product according to claim 14, wherein the psychological data score is weighed more heavily for women than for men.

26. The computer program product according to claim 14, wherein the match list further comprises detailed information about the compatibility between the user and each target with respect to individual characteristics.

27. A system for selecting and matching personal profiles based on personal characteristics and psychological traits, the system comprising:
   (a) a profiling component for creating a profile of a user based on the user's personal characteristics and answers to psychological test items, wherein the profile further includes user preferences concerning potential partners;
   (b) a filtering component that applies a plurality of trait filters to a plurality of target profiles in a database, wherein each target profile passes through a given trait filter only if the trait in question in both the target profile and the user profile complies with the filter's rule, and wherein the filter may be influenced by preferences in both the user profile and the plurality of target profiles;
   (c) wherein at least a subset of said filters use binary scoring, wherein:
      if a characteristic in a target profile has a true value, the filter assigns a normal score to the characteristic; and
      if the characteristic has a false value, the filter excludes the target profile;
   (d) a calculating components that calculates a compatibility index for the user relative to each target profile that passes through all of the trait filters, wherein the compatibility index is calculated by the following steps:
      scoring individual personal characteristics and weighing the scores according to empirically derived models and user preferences to produce a combined personal characteristic score;
      scoring the psychological data according to matching algorithms derived from empirical research on relationships; and
      weighing the psychological data score relative to the combined personal characteristic score according to the user's gender and preference regarding short-term versus long-term relationships; and
   (e) an organizing component that creates and displays a match list that ranks target profiles relative to the user according to their respective compatibility index.

* * * * *